3,349,131
CONVERSION OF CYCLO-ALKANE CARBOXYLIC
ACID TO CYCLO-ALKANONE
Eduard F. J. Duynstee, Geleen, Johan A. Bigot, Beek, and
Jan L. J. P. Hennekens, Geleen, Netherlands, assignors
to Stamicarbon N.V., Heerlen, Netherlands
No Drawing. Filed Feb. 15, 1965, Ser. No. 432,837
Claims priority, application Netherlands,
Feb. 17, 1964, 64—1,389
8 Claims. (Cl. 260—586)

The present invention relates to the conversion of a cyclo-alkane carboxylic acid to a cyclo-alkanone by pyrolitic oxidation and decarboxylation of the carboxylic acid by means of gases containing molecular oxygen.

It is common knowledge that phenols can be obtained from aromatic monocarboxylic acid by pyrolitic oxidation and decarboxylation, by means of gases containing molecular oxygen, if the reaction is carried out in the liquid phase in the presence of a copper compound dissolved in the reaction mixture as a catalyst.

If, in a similar way, a cyclo-alkane carboxylic acid is converted by means of gases containing molecular oxygen in the presence of a copper compound or another metal compound, the reaction yields products of which the corresponding cyclo-alkanone, cyclo-alkene, and cyclo-alkene carboxylic acid are all formed as the main constituents of the reaction products.

It has now been found that, curiously enough, if no catalyst is added, substantially only cyclo-alkanone is obtained in this reaction.

Accordingly, this invention relates to a process for converting a cyclo-alkane carboxylic acid to the corresponding cyclo-alkanone by pyrolysis of the carboxylic acid in the liquid phase with a gas containing molecular oxygen at a temperature of at least 150° C., in the absence of any added catalyst.

In contrast to the results of pyrolitic oxidation and decarboxylation in the presence of catalyst, the process according to the invention, in which no catalysts are added yields the corresponding cyclo-alkanone, as substantially the main constituent of the reaction products, with hardly any cyclo-alkene or cyclo-alkene carboxylic acid being formed.

An explanation of this curious result—although the invention is by no means bound to an explanation—may possibly be that the tertiary carbon atom in the molecule of the cyclo-alkane carboxylic acid is more reactive than the neighboring carbon atom in the ortho position, and that this difference in reactivity is changed by the presence of catalysts.

When the process according to the invention is carried out, the resulting cyclo-alkanone product can be recovered from the reaction production by distillation, so that a continuous process can be realized in a simple way.

During the conversion, it is important that the temperature is maintained above 150° C. At lower temperatures, hardly any reaction takes place. Reaction temperatures higher than the boiling point of the cyclo-alkane carboxylic acid may be used and the reaction may be carried out at an elevated pressure, e.g., 20, 40, 100 or 150 atm. The reaction temperature should not exceed the decomposition point of the cyclo-alkanone product, and preferably should not be above about 450° C. The application of an elevated pressure in that range promotes the reaction with oxygen gases.

The reaction with oxygen is also promoted by the presence of water, which opposes the formation of esters. Water may be added to the carboxylic acid, e.g., an aqueous solution of the carboxylic acid may be used, while, furthermore, water vapor may be added to the gas containing oxygen.

The process of this invention will be further understood by reference to the following working example of a presently preferred embodiment thereof.

*Example*

In a 0.5-litre reaction vessel containing 205 g. of cyclohexane carboxylic acid, a gas consisting of air, nitrogen, and water vapor (volume ratio 1:1:1) is passed continuously through the liquid at a temperature of 205° C. by means of a distributing device. The rate of the gas flow is 240 litres per hour. The reaction is carried out at atmospheric pressure.

In addition, cyclohexane carboxylic acid was continuously fed into the reaction vessel at the rate of 12 g. per hour, as a result of which a constant liquid level is maintained.

The gases issuing from the reaction vessel are passed through a fractionating column, in which the temperature is maintained at about 80° C., so that the bulk of cyclohexane carboxylic acid entrained in the gases flows back into the reaction vessel. The cyclohexanone product, entrained in the gas stream, is then subsequently condensed therefrom and separated, e.g., by distillation, from the small amount of cyclohexane carboxylic acid that may also be carried over.

Per hour, 6.5 g. of cyclohexanone is recovered (efficiency 80%), while 1.5 g. of cyclohexane carboxylic acid separated off is recycled.

It will be noted the process of this example may be carried out continuously, as indicated, or the process may be carried out batchwise, although this latter procedure is ordinarily less attractive commercially.

As indicated above, the process of this invention is preferably carried out using cyclohexane carboxylic acid as the starting material, to produce cyclohexanone product. The process is not, however, limited to this particular starting material, and may also be employed with cyclopentane carboxylic acid or cyclo-heptane carboxylic acid to form cyclopentanone or cycloheptanone, respectively.

Nothwithstanding the foregoing postulation as to the possible reason for the particular results of the process of this invention, as compared to the previously practiced catalytic techniques, it has also been discovered the process of this invention may be employed with substituted cyclo-alkane carboxylic acid, in particular, lower alkyl-substituted cyclo-alkane carboxylic acids, provided that the ring carbon atom to which the carboxylic acid substituent is attached also carries a hydrogen atom. For instance, the process of this invention may be conducted using 2-, 3-, or 4-methyl-substituted cyclohexane carboxylic acid, or the corresponding ethyl-substituted cyclohexane carboxylic acid, or the like.

It will further be understood this invention may be practiced in manners other than those specifically described and illustrated herein, and is limited only by the spirit and scope of the following claims.

What is claimed is:
1. A process for converting lower alkyl substituted cyclo-alkane carboxylic acid of from 5 to 7 ring carbon atoms to the corresponding cyclo-alkanone which comprises pyrolysing said carboxylic acid in the liquid phase with a molecular-oxygen-containing gas stream in the absence of any added catalyst and at a temperature of at least 150° C. but does not exceed the decomposition point of the cyclo-alkanone product and is at most about 450° C., whereby the cyclo-alkanone corresponding to the cyclo-alkane carboxylic acid is formed substantially free from cyclo-alkene and cyclo-alkene carboxylic acid by-products.

2. A process for converting cyclohexane carboxylic acid to cyclohexanone substantially free from cyclohexene and cyclohexene carboxylic acid, which process comprises reacting the cyclohexane carboxylic acid in the liquid phase with a molecular-oxygen-containing gas stream in the absence of any added catalyst at a temperature between about 150° C. and 450° C., and distilling from the reaction mixture the cyclohexanone product which is formed.

3. The process of claim 2, wherein said reaction is conducted at an elevated temperature between atmospheric pressure and 150 atmospheres.

4. A continuous process for producing cyclohexanone from cyclohexane carboxylic acid which comprises continuously introducing into a reaction vessel cyclohexane carboxylic acid in the liquid phase, continuously passing through said liquid phase in said reaction vessel a gas stream in the absence of any catalyst containing molecular oxygen, while maintaining the temperature of said liquid phase above about 150° C. and below the decomposition temperature of cyclohexanone, at most about 450° C., and continuously removing from said reaction vessel a gas stream containing entrained cyclohexanone vapors, and thereafter condensing and recovering said entrained cyclohexanone vapors.

5. The process of claim 4, wherein said gas stream leaving said reaction vessel is first passed through a fractionating column maintained at a temperature of about 80° C. to remove therefrom the entrained cyclohexane carboxylic acid, and retaining said removed acid to the said reaction vessel, prior to said condensing and recovering of the cyclohexanone product.

6. The process of claim 5, wherein said cyclohexanone product is, after said condensation, distilled to separate the same from any cyclohexane carboxylic acid remaining in said condensed cyclohexanone.

7. The process of claim 4, wherein said gas stream consists essentially of air, nitrogen, and water vapor at a volume ratio of 1:1:1.

8. The process of claim 4, wherein said liquid phase is maintained at a temperature of about 205° C., and at atmospheric pressure.

References Cited

UNITED STATES PATENTS 3,219,698  11/1965  Bigot et al. _____ 260—586 X

LEON ZITVER, *Primary Examiner.*

BERNARD HELFIN, *Examiner.*

M. JACOB, *Assistant Examiner.*